United States Patent
Schoenlieb et al.

(10) Patent No.: US 11,758,078 B2
(45) Date of Patent: Sep. 12, 2023

(54) METHODS AND APPARATUSES FOR COMPENSATING LIGHT REFLECTIONS FROM A COVER OF A TIME-OF-FLIGHT CAMERA

(71) Applicant: Infineon Technologies AG, Neubiberg (DE)

(72) Inventors: Armin Schoenlieb, Seiersberg-Pirka (AT); David Lugitsch, Graz (AT); Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 287 days.

(21) Appl. No.: 16/830,774

(22) Filed: Mar. 26, 2020

(65) Prior Publication Data
US 2020/0314294 A1     Oct. 1, 2020

(30) Foreign Application Priority Data
Mar. 27, 2019   (EP) ..................................... 19165400

(51) Int. Cl.
*H04N 5/222* (2006.01)
*G01S 17/894* (2020.01)
*H04N 23/50* (2023.01)
*H04N 25/705* (2023.01)

(52) U.S. Cl.
CPC ......... *H04N 5/2226* (2013.01); *G01S 17/894* (2020.01); *H04N 23/50* (2023.01); *H04N 25/705* (2023.01)

(58) Field of Classification Search
None
See application file for complete search history.

(56) References Cited

U.S. PATENT DOCUMENTS

| | | | | |
|---|---|---|---|---|
| 7,164,117 B2* | 1/2007 | Breed | ............... | B60R 21/01516 |
| | | | | 250/208.1 |
| 9,030,676 B2* | 5/2015 | Murakami | ............. | G01B 11/02 |
| | | | | 356/625 |
| 2014/0152813 A1* | 6/2014 | Wilks | ...................... | G01S 17/36 |
| | | | | 348/138 |
| 2018/0209846 A1* | 7/2018 | Mandai | ................. | G01S 17/894 |
| 2019/0146086 A1* | 5/2019 | Sato | ....................... | G01S 7/4865 |
| | | | | 250/206.1 |

FOREIGN PATENT DOCUMENTS

| | | |
|---|---|---|
| DE | 19704496 A1 | 3/1998 |
| EP | 1988389 A1 | 11/2008 |
| EP | 2680035 A1 | 1/2014 |

* cited by examiner

*Primary Examiner* — James M Hannett
(74) *Attorney, Agent, or Firm* — Murphy, Bilak & Homiller, PLLC (57) ABSTRACT

Provided is a method for compensating light reflections from a cover of a time-of-flight camera in an image of a scene that is sensed by the time-of-flight camera. The method includes receiving the image of the scene from the time-of-flight camera. Further, the method includes modifying the image of the scene using a reference image to obtain a compensated image of the scene. Pixels of the reference image indicate reference values exclusively related to light reflections from the cover of the time-of-flight camera. Additionally, the method includes outputting the compensated image.

21 Claims, 5 Drawing Sheets

METHODS AND APPARATUSES FOR COMPENSATING LIGHT REFLECTIONS FROM A COVER OF A TIME-OF-FLIGHT CAMERA

TECHNICAL FIELD

The present disclosure relates to error correction for Time-of-Flight (ToF) sensing. In particular, examples relate to methods and apparatuses for compensating light reflections from a cover of a ToF camera.

BACKGROUND

ToF cameras are conventionally covered by a cover glass to protect the imager element and the illumination element against the surrounding environment. However, light emitted by the illumination element is partly reflected by the cover glass. The reflection causes erroneous measurements due to unwanted light mixes of the light reflected by the cover glass with light reflected by a scene sensed by the ToF camera.

SUMMARY

Hence, there may be a demand for compensating light reflections from a cover of a ToF camera.

The demand may be satisfied by the subject matter of the embodiments described herein.

An example relates to a method for compensating light reflections from a cover of a ToF camera in an image of a scene that is sensed by the ToF camera. The method comprises receiving the image of the scene from the ToF camera. Further, the method comprises modifying the image of the scene using a reference image to obtain a compensated image of the scene. Pixels of the reference image indicate reference values exclusively related to light reflections from the cover of the ToF camera. Additionally, the method comprises outputting the compensated image.

Another example relates to a further method for compensating light reflections from a cover of a ToF camera. A light capturing element of the ToF camera is covered by the cover and comprises an array of photonic mixer devices. Each of the photonic mixer devices separates a charge generated by light arriving at the photonic mixer device so that two charge values are provided for the respective photonic mixer device. The method comprises receiving the charge values for the photonic mixer devices. Further, the method comprises modifying the charge values using reference values exclusively related to light reflections from the cover of the ToF camera to obtain compensated charge values. The method additionally comprises outputting the compensated charge values.

Those skilled in the art will recognize additional features and advantages upon reading the following detailed description, and upon viewing the accompanying drawings.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
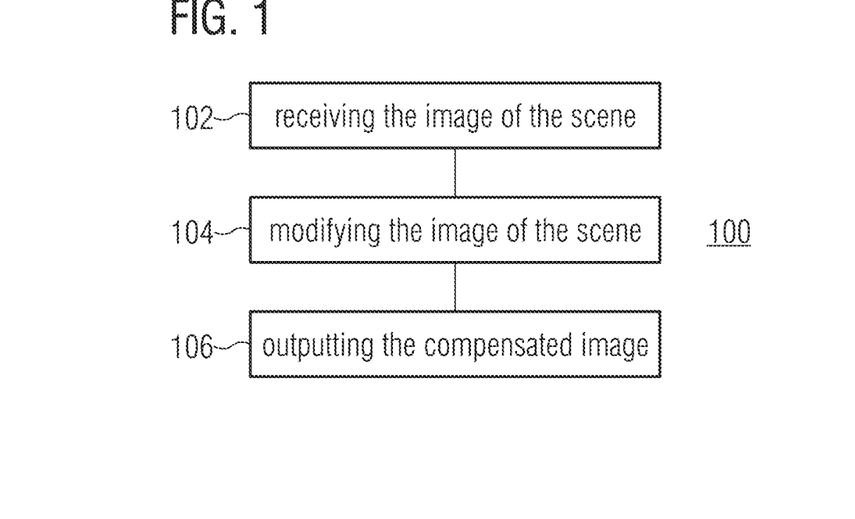
FIG. 1 illustrates a flowchart of an example of a method for compensating light reflections from a cover of a ToF camera in an image of a scene that is sensed by the ToF camera.

FIG. 1 illustrates a flowchart of a method 100 for compensating light reflections from a cover of a ToF camera in an image of a scene that is sensed by the ToF camera. Prior to describing method 100 in detail, some basics of ToF depth measurement will introductorily be described in the following paragraphs for pedagogical reasons with respect to FIG. 2.

Figure 2:
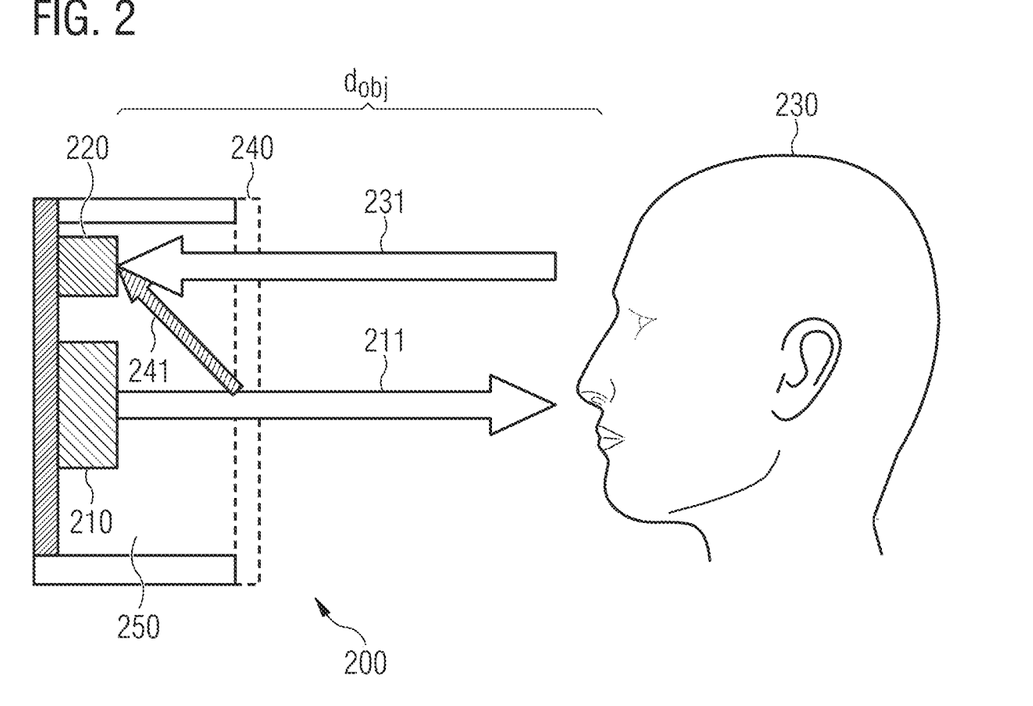
FIG. 2 illustrates an example of a ToF camera.

A ToF camera 200 comprises an illumination element 210 for illuminating the scene with modulated light 211 (e.g. infrared light). The illumination element 210 generates the modulated light 211 based on a (electric) modulated radio frequency signal such as a continuous wave modulated signal (e.g. by controlling one or more Light-Emitting Diodes, LEDs, or one or more laser diodes based on the modulated signal). An object 230 in the scene that is illuminated by the modulated light 211 reflects at least part of the modulated light 211 back to a light capturing element 220 (e.g. comprising optics, an image sensor and driver electronics) of the ToF camera 200. In other words, the light capturing element 220 receives reflected light 231 from the object 230. For example, the object 230 may be a human face, if the ToF camera 200 is used for secure face recognition.

The image sensor of the light capturing element 220 is pixelated and each pixel measures a fraction of the reflected light 231. Accordingly, (electric) measurement signals based on the reflected light 231 from the scene are generated. For example, each pixel may comprise a Photonic Mixer Device (PMD) for measuring the reflected light 231.

Depending on the distance $d_{obj}$ between the ToF camera 200 and the object 230, i.e. depending on the depth, the reflected light 231 exhibits a delay with respect to the emission of the modulated light 211. Accordingly, the measurement signals experience distance dependent (depth dependent) phase shifts with respect to the modulated radio frequency signal.

The modulated signal and the measurement signal of the respective pixel are correlated according to a (auto)correlation function $c(\delta + \varphi_d)$ in order to obtain a correlation value L for each pixel. The correlation function $c(\delta + \varphi_d)$ mimics a phase-distance function describing the relation between the distance $d_{obj}$ and a phase value as measured by each pixel of the ToF camera 200

The output of the correlation function $c(\delta + \varphi_d)$ is the correlation value L for each pixel. The determined correlation values L are then combined to a raw image (sometimes also referred to as "phase image"). That is, the raw image comprises a plurality of pixels each representing a corresponding correlation value L.

In order to sample the correlation function $c(\delta + \varphi_d)$, plural raw images are generated. A phase offset δ between the modulated signal and the measurement signals as used for the correlations varies between the individual raw images. In other words, different phase offsets δ are used for correlating the modulated signal and the measurement signals in order to obtain the individual raw images.

Sampling the same object at the same distance and exhibiting the same reflectivity enables to sample the correlation function $c(\delta + \varphi_d)$. For example, phase offsets of 0°, 90°, 180° and 270° may be used to generate four raw images each comprising a plurality of pixels that represent corresponding correlation values $L_{0°}$, $L_{90°}$, $L_{180°}$, and $L_{270°}$.

For the phase correlation value $L_{0°}$, the correlation function $c(\delta + \varphi_d)$ is shifted by the distance dependent phase shift $\varphi_d$ between the measurement signal and the modulated signal of the pixel with respect to the zero value of the function's argument.

Using the four correlation values $L_{0°}$, $L_{90°}$, $L_{180°}$, and $L_{270°}$, that sample the correlation function $c(\delta + \varphi_d)$, the phase shift (phase angle) $\varphi_d$ may be determined as follows:

$$\varphi_d = a\tan 2\left(\frac{L_{90°} - L_{270°}}{L_{0°} - L_{180°}}\right) \quad (1)$$

Taking into account the speed of light c and the modulation frequency $f_p$ of the emitted light 211 (i.e. the modulation frequency of the modulated signal), the distance $d_{obj}$ to the object 230, i.e. the depth, may be calculated as follows:

$$d_{obj} = \frac{c}{2} \cdot \frac{\varphi_d}{2\pi \cdot f_p} \quad (2)$$

The illumination element 210 and the light capturing element 220 are arranged (housed) in a common cavity 250 that is covered by a cover 240 in order to protect the illumination element 210 and the light capturing element 220 from the surrounding environment (e.g. from dust or moisture). The cover 240 may, e.g., be made up of glass, plastics or any other suitable material. For example, the cover 240 may be a glass cover of a mobile phone or an automotive ToF system. In some examples, the cover 240 may be an OLED (Organic Light Emitting Diode) display. It is to be noted that the cover 240 may be any element that is capable of protecting the illumination element 210 and the light capturing element 220 from the surrounding environment and that is at least partially transparent for the modulated light 211 as emitted by the illumination element 210 and the reflected light 231 to be received by the light capturing element 220.

As indicated in FIG. 2, the modulated light 211 emitted by the illumination element 210 is partially reflected by the cover 240. Accordingly, in addition to the wanted reflected light 231 from the object 230, the light capturing element 220 additionally receives unwanted reflected light 241 from the cover 240, The unwanted reflected light 241 from the cover 240 mixes with the wanted reflected light 231 from the object 230 and causes erroneous measurements by the ToF camera. This is exemplarily illustrated in FIGS. 3 and 4 for another scene sensed by the ToF camera.

Figure 3:
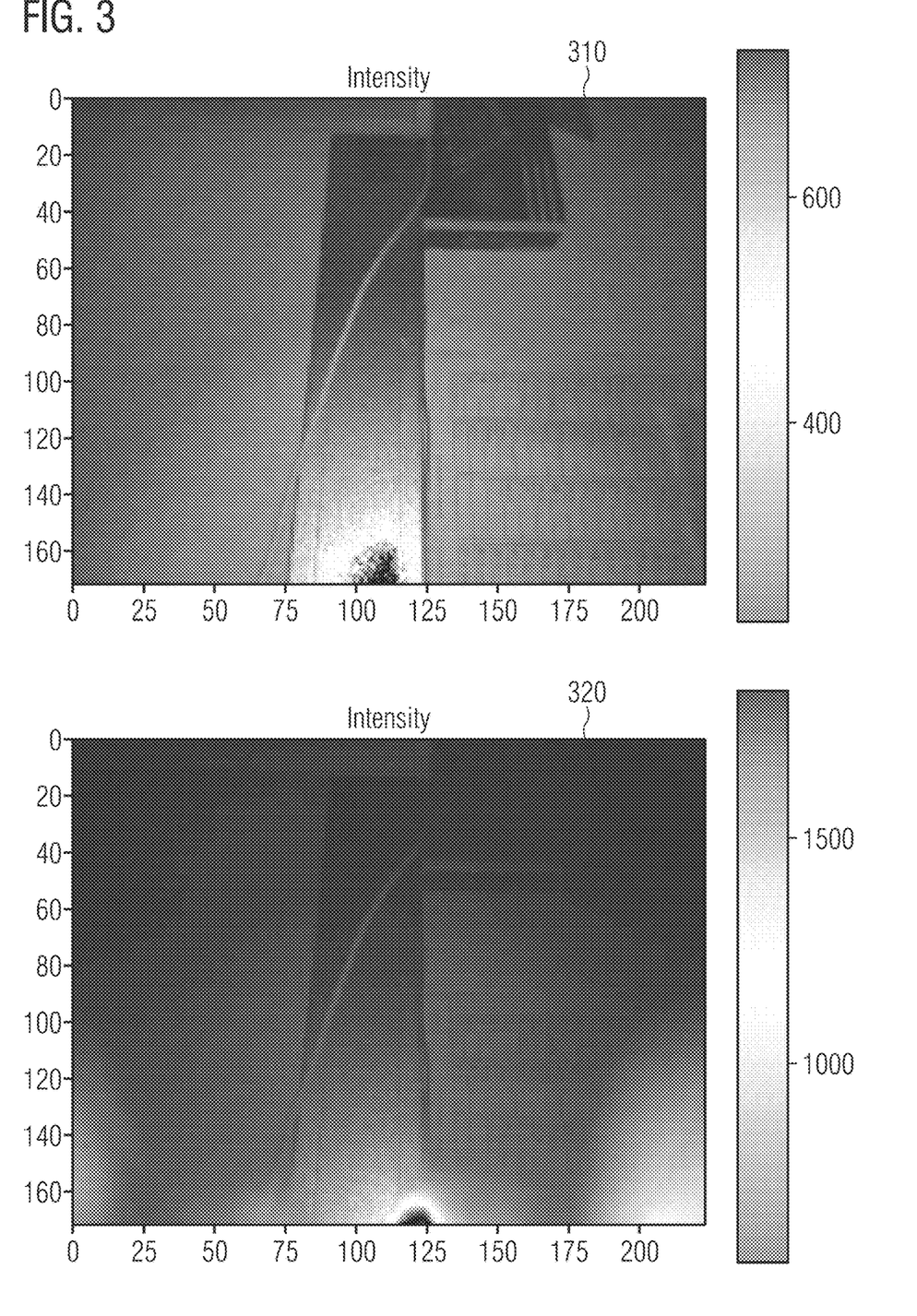
FIG. 3 illustrates an exemplary comparison between two intensity images of a ToF camera.

FIG. 3 illustrates a comparison between two intensity images taken by the ToF camera 200. The upper intensity image 310 is taken by the ToF camera 200 without the cover 240. In other words, the cover 240 is removed while the image 310 is taken by the ToF camera 200. As a comparison, the lower intensity image 320 is taken by the ToF camera with the cover 240 installed.

The unwanted reflected light 241 from the cover 240 mixes with the wanted reflected light 231 from the sensed scene. As can be seem from the intensity images 310 and 320, the contrast of the intensity image worsens due to the unwanted reflected light 241 from the cover 240.

Figure 4:
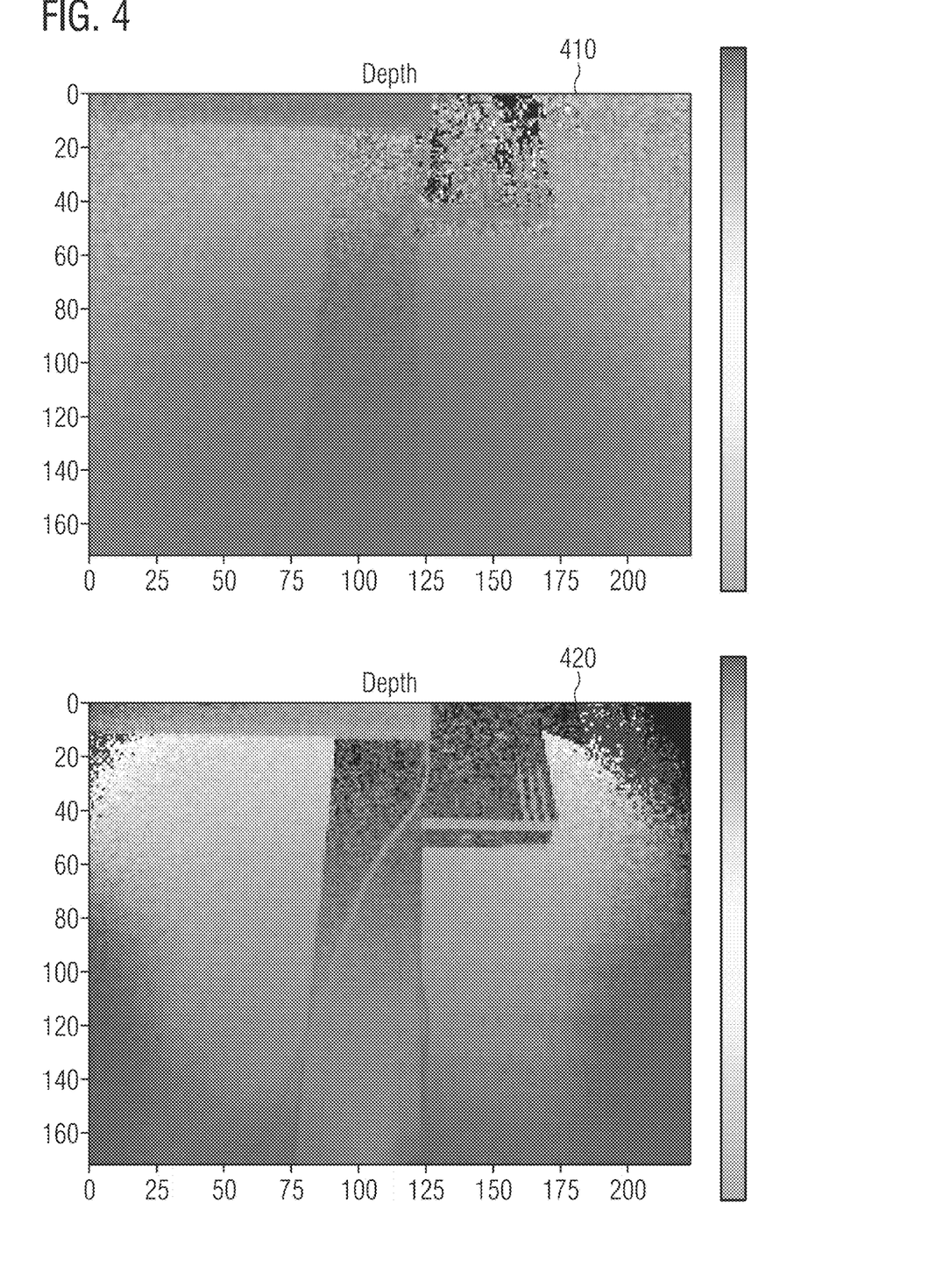
FIG. 4 illustrates an exemplary comparison between two depth images of a ToF camera.

FIG. 4 illustrates two depth images 410 and 420 of the ToF camera 200 that correspond to the intensity images 310 and 320 illustrated in FIG. 3. The upper depth image 410 is taken by the ToF camera 200 without the cover 240, whereas the lower depth image 420 is taken by the ToF camera with the cover 240 installed. As can be seen from the depth images 410 and 420, the unwanted reflected light 241 from the cover 240 affects the depth measurement of the ToF camera 200.

Referring back to FIG. 1, method 100 may allow to compensate for light reflections from a cover of a ToF camera in an image of a scene that is sensed by the ToF camera. Method 100 comprises receiving 102 the image of the scene from the ToF camera. The image of the scene may be any type of image that can be provided by a ToF camera such as, e.g., a raw image, an image derived from the raw image, an intensity image, an image derived from the intensity image, a depth image or an image derived from the depth image. The image derived from the raw image may, e.g., be a phase-angle image comprising pixels that represent phase shifts (phase angles) derived from one or more correlation values for the respective pixel of the illumination element. In other examples, an image derived from one of the images listed above, may be an image that is based on the respective image and error corrected for one or more errors of the ToF camera. In some examples, an image derived from one of the images listed above, may be an image that is based on a combination of the respective image and another image (e.g. a combination of two depth images captured using modulation signals of different frequency).

Further, method 100 comprises modifying 104 the image of the scene using a reference image to obtain a compensated image of the scene. Pixels of the reference image indicate (represent) reference values exclusively related to light reflections from the cover of the ToF camera. In other words, the pixels of the reference image indicate values that are caused (substantially) only by the light reflections from the cover of the ToF camera but not from light reflections of any other object such as an object in the surrounding environment of the ToF camera. The reference image may, e.g., be a reference raw image, a reference depth image or a reference intensity image. For example, pixels of a reference depth image merely indicate depth values related to/caused by light reflections from the cover of the ToF camera. The reference image, hence, characterizes the effect of the light reflections from the cover on images taken by the ToF camera. Accordingly, the reference image allows to compensate for the effect of the light reflections from the cover in the image of the scene.

When modifying 100 the image of the scene, the values indicated by the pixels of the image of the scene are modified by the reference values indicated by the pixels of the reference images. For example, the image of the scene may be modified pixelwise using the reference image. In other words, a value indicated by a pixel of the image of the scene is modified by a reference value indicated by a pixel located at the same pixel position in the reference image. For example, a reference value indicated by a pixel of the reference image may be subtracted from a value indicated by a pixel of the image of the scene. However, the proposed concept is not limited to subtracting reference values from values indicated by the pixels of the image of the scene. In general, the pixels of the image of the scene may be modified/adjusted/varied in any suitable way based on the pixels of the reference image.

Method 100 comprises additionally outputting 106 the compensated image of the scene. Similar to what is described above for the received image of the scene, the compensated image of the scene may, e.g., be a raw image, an image derived from the raw image, an intensity image, an image derived from the intensity image, a depth image or an image derived from the depth image.

The compensated image of the scene is corrected for the effects of the light reflections from the cover of the ToF camera. Hence, erroneous measurements by the ToF camera as represented by the pixels of the image of the scene may be at least mitigated in the compensated image of the scene. In some examples, the compensated image of the scene may be free from effects of the light reflections from the cover of the ToF camera.

As described above, the reference image may be a reference raw image in some examples. In order to sense the scene, the ToF camera may use a continuous wave modulated signal for illuminating the scene and generate measurement signals based on reflected light from the scene as described above. In accordance with the above described general concept of ToF sensing, a raw image of the scene is, hence, based on correlations of the continuous wave modulated signal and the measurement signals according to the correlation function $c(\delta+\varphi_d)$. In order to properly correct the raw image of the scene, the reference raw image may be selected from a plurality of reference raw images based on the phase offset $\delta$ between the continuous wave modulated signal and the measurement signals as used for the correlations. The plurality of reference raw images may correspond to different phase offsets. Accordingly, for each used phase offset $\delta$, a proper (an according) reference raw image for correcting the light reflections from the cover of the ToF camera may be selected.

Similarly, the reference raw image may be selected from the plurality of reference raw images based on a frequency of the continuous wave modulated signal. The plurality of reference raw images may correspond to different frequencies for the continuous wave modulated signal. Accordingly, for each frequency of the continuous wave modulated signal, a (an according) reference raw image for correcting the light reflections from the cover of the ToF camera may be selected.

For example, if four raw images using four different phase offsets are taken by the ToF camera, four reference raw images may be provided for correcting the raw images. If four additional raw images using the four different phase offsets are taken for another frequency of the continuous wave modulated signal, four additional reference raw images may be provided for correcting the four additional raw images for the other frequency of the continuous wave modulated signal. In other words, for each parameter (phase and frequency), a separate reference image may be provided.

The reference raw image may, e.g., be based on a factory calibration. That is, the reference raw image may be generated or provided during a production process of the ToF camera. For example, the reference raw image may be captured by the ToF camera in a defined production (calibration) environment not containing any reflective objects. For example, the ToF camera may sense a white wall so that only the cover of the ToF camera causes reflections. The reference raw image may be saved and be subtracted from the later taken image of the scene as described above. This approach is feasible since the light capturing element integrates all incoming light into correlation values (or phase values).

In some examples, the reference raw image may be generated or be (e.g. sporadically) updated during operation of the ToF camera. For example, coded modulation may be used to fix a measurement range of the ToF camera to the cover of the ToF camera in order to characterize the cover of the ToF camera. For coded modulation, a code modulated signal is used for illumination instead of a continuous wave modulated signal. In a code modulated signal, the sequence of pulses is altered. In other words, while a continuous wave modulated signal exhibits an alternating series of high and low pulses of equal length (duration), a code modulated signal exhibits pulses of varying length. For example, Kasami code sequences or m-sequences may be used for a code modulated signal.

A consequence of the code modulated signal for illumination is that the correlation function is only different from a constant value for reflected light originating from a certain distance range with respect to the ToF camera. In other words, only light reflected from an object within a certain distance range causes a value of the correlation function that is different from the constant value. In terms of a mathematical expression, this may be expressed as follows:

$$c(d) = \begin{cases} f(d) & \text{if } d_{min} \leq d \leq d_{max} \\ a & \text{if } d < d_{min} \text{ or } d > d_{max} \end{cases}, \quad (3)$$

with c(d) denoting the correlation function, d denoting the distance to the ToF camera of the object reflecting the light, a denoting a constant value, f(d) denoting a distance dependent function, $d_{min}$ denoting a minimum distance of the object reflecting the light to the ToF camera for which the correlation function is sensitive to reflected light and $d_{max}$ denoting a maximum distance of the object reflecting the light to the ToF camera for which the correlation function is sensitive to reflected light.

In other words, a correlation range of the correlation function is limited for a code modulated signal compared to a continuous wave modulated signal. The correlation range for which the correlation function is sensitive for reflected light from an object sensed by the ToF camera defines the measurement range of the ToF camera. That is, the measurement range of the ToF camera corresponds to the correlation range of the correlation function for which the correlation function outputs distance dependent output values.

Figure 5:
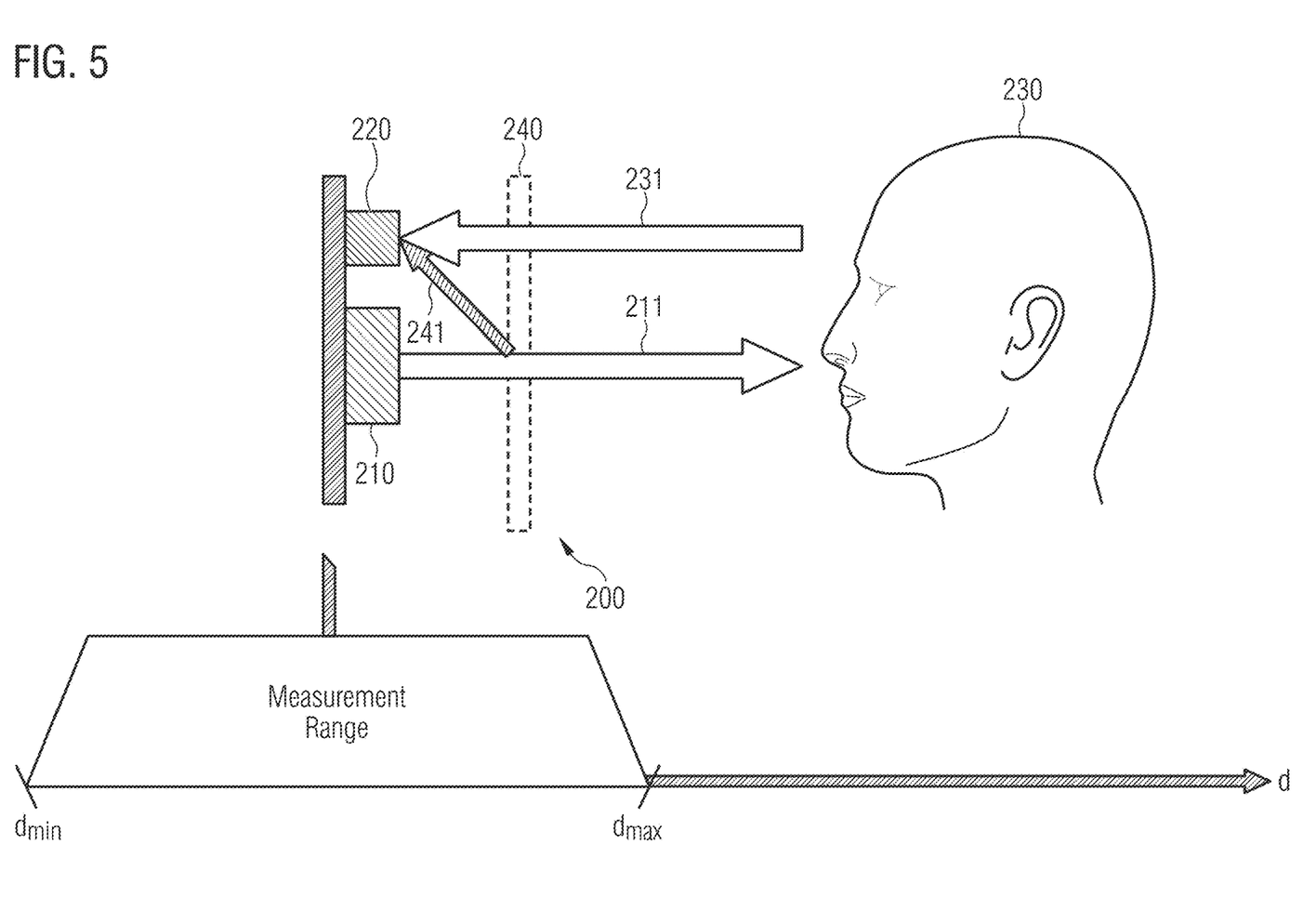
FIG. 5 illustrates an example of a measurement set-up for determining a reference image.

Hence, method 100 may in some examples comprise controlling the ToF camera 200 to use a code modulated signal for illumination such that a measurement range of the ToF camera 200 ends immediately after the cover 240 as illustrated in FIG. 5. That is, a designed code modulated signal is used such that a desired code correlation is achieved. Accordingly, a raw image captured by the ToF camera 200 based on the code modulated signal only comprises pixels indicating values exclusively related to light reflections from the cover 240 of the ToF camera 200. In other words, this raw image exclusively characterizes the cover 240 of the ToF camera 200. Therefore, this raw image may be used reference raw image. Coded modulation may enable to characterize the cover of the ToF camera 200 during operation. Further, changes in the reflectivity of the cover 240 may be detected (e.g. caused by fingerprints, dirt, scratches, protection foils, fogging, rain, etc.).

In other examples, a continuous wave modulated signal may be used instead of a coded modulation signal for characterizing the cover of the ToF camera. For example, method 100 may comprises receiving a depth image from the ToF camera, and determining a closest reflective object depicted in the depth image. Further, method 100 may comprise determining an exposure time for the ToF camera such that a measurement range of the ToF camera ends before the closest reflective object. The power of the reflected light decreases square with the distance of the reflecting object to the ToF camera. Accordingly, by adjusting the exposure time of the ToF camera, only reflected light from objects exhibiting an exposure time dependent maximum distance to the ToF camera will contribute to the measurement signals. Reflected light from objects exhibiting a greater distance will only be noticeable in the noise floor of the light capturing element. Therefore, by appropriately setting the exposure time for the ToF camera, it may be ensured that the reflected light of the closest reflective object will only contribute to the noise floor of the light capturing element. Therefore, method 100 may further comprises controlling the ToF camera to capture an auxiliary raw image using the determined (set) exposure time. The auxiliary raw image may accordingly be used as the reference image since it only comprises pixels indicating values caused by exclusively the cover of the ToF camera.

In still further examples, method 100 may comprise receiving a depth image from the ToF camera, and determining whether any reflective object at a greater distance than the cover of the ToF camera is depicted in the depth image. If no reflective object at a greater distance than the cover is depicted in the depth image, method 100 may comprise controlling the ToF camera to capture an auxiliary raw image. The auxiliary raw image may accordingly be used as the reference image since it only comprises pixels indicating values caused by exclusively the cover of the ToF camera.

In some examples, the reference image may be a reference depth image as described above. In order to generate or update the reference depth image, method 100 may, e.g., comprise receiving a depth image from the ToF camera, and determining whether any reflective object at a greater distance than the cover is depicted in the depth image. If no reflective object at a greater distance than the cover is depicted in the depth image, the depth image may be used as the reference depth image since it only comprises pixels indicating values caused by exclusively the cover of the ToF camera.

Alternatively, the reference image may be a reference intensity image (e.g. a greyscale image) in some examples. The reference intensity image may be used to correct intensity images of the ToF as well as other images of the ToF camera such as raw images. For example, if the light capturing element of the ToF camera uses PMDs for detecting the reflected light, the gate of the PMI) is modulated during regular operation such that charges caused by the incoming light are separated (e.g. collected in two separate capacitors). In the greyscale mode, all charges are summed (e.g. collected in one capacitor). The different operation principles may be considered using a scaling factor. Accordingly, modifying 104 the phase image of the scene using the reference intensity image may comprise scaling the reference values indicated by the pixels of the reference intensity image by a scaling factor to obtain a scaled reference intensity image. Further, modifying 104 the phase image of the scene using the reference intensity image may comprise modifying the image of the scene using the scaled reference intensity image similar to what is described above in order to obtain the compensated image.

In some examples, exposure times of the image of the scene and the reference image may be equal. In other words, the exposure time used for capturing the image of the scene and the reference image may be identical.

Alternatively, the exposure times used for capturing the image of the scene and the reference image may be different. Different exposure times for the image of the scene and the reference image may be compensated by a scaling factor. For example, if exposure times of the image of the scene and the reference image are different, modifying 104 the image of the scene using the reference image may comprise scaling the reference values indicated by the pixels of the reference image by a scaling factor to obtain a scaled reference image. The scaling factor is based on (e.g. identical or proportional to) a ratio of the exposure times of the image of the scene and the reference image. Further, modifying 104 the image of the scene using the reference image may comprise modifying the image of the scene using the scaled reference image as described above in order to obtain the compensated image of the scene. Accordingly, the image of the scene captured by the ToF camera using a first exposure time may be corrected using a reference image captured using a different second exposure time. For example, this may allow to omit saving a reference image for each exposure time supported by the ToF camera.

In the foregoing, it is described to correct for the light reflections from the cover of the ToF camera at the image level. However, the proposed concept is not limited to error correction at the image level. In some examples, the compensation of light reflections from the cover of the ToF camera may already be done at the charge level of the light capturing element. This will be described with more details in connection with FIG. 6.

Figure 6:
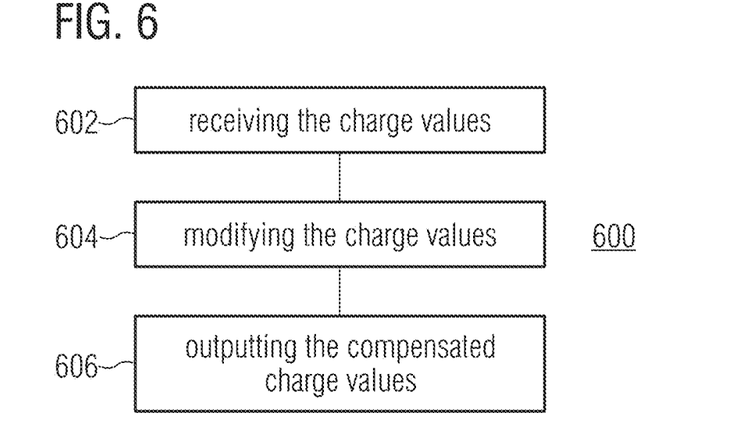
FIG. 6 illustrates a flowchart of an example of another method for compensating light reflections from a cover of a ToF camera.

FIG. 6 illustrates a flowchart of a method 600 for compensating light reflections from a cover of a ToF camera. As described above (e.g. FIG. 2), the light capturing element of the ToF camera is covered by the cover. In the example of FIG. 6, the light capturing element comprises an array of PMDs so that each PMD measures a fraction of the light arriving at the light capturing element (e.g. each pixel of the light capturing element may comprise a PMD). PMDs as such are known such that the structure of the PMDs will not be described in detail in the present disclosure. Each PMD separates a charge generated by light arriving at the PMD based on the modulated signal used for illumination so that (at least) two charge values are provided for the respective PMD (i.e. for each PMD of the array of PMDs).

Method 600 comprises receiving 602 the charge values for the PMDs. For example, the charge values for the PMDs may be represented by analog or digital values provided by the PMDs or connected circuitry (such as an Analog-to-Digital Converter, ADC).

Similar to what is described above for the image level, method 600 further comprises modifying 604 the charge values using reference (charge) values exclusively related to light reflections from the cover of the ToF camera in order to obtain compensated charge values. In other words, the reference values are caused (substantially) only by the light reflections from the cover of the ToF camera but not from light reflections of any other object such as an object in the surrounding environment of the ToF camera. The reference values, hence, characterize the effect of the light reflections from the cover on the charges generated by the PMDs. Accordingly, the reference values allow to compensate for the effect of the light reflections from the cover in the charges generated by the PMDs.

For example, the charge values of each of the PMDs may be modified using the reference values. Separate reference values may be provided for each of the PMDs in some examples. In other examples, separate reference values may be provided for different sub-sets of the array of PMDs. In further examples, the same reference values may be provided for all PMDs.

For example, the reference values may be subtracted from the charge values for the PMDs. However, the proposed concept is not limited to subtracting reference values from the charge values for the PMDs. In general, the charge values for the PMDs may be modified/adjusted/varied in any suitable way based on the reference values.

Method 600 comprises additionally outputting 606 the compensated charge values. For example, a raw image may be determined based on the compensated charge values.

Similar to what is described above for the image level, the compensated charge values are corrected for the effects of the light reflections from the cover of the ToF camera. Hence, erroneous measurements by the ToF camera as represented by the charge values for the PMDs may be at least mitigated in the compensated charge values. In some examples, the compensated charge values may be free from effects of the light reflections from the cover of the ToF camera.

The reference values for modifying the charge values for the PMDs may be determined similar to what is described above for the reference images. For example, if no reflective object at a greater distance than the cover is depicted in a depth image of the ToF camera, the ToF camera may be controlled to capture an auxiliary image. The charge values for the PMDs obtained when capturing the auxiliary image may be used as reference values since they are caused by exclusively the cover of the ToF camera. Alternatively, the charge values for the PMDs obtained when capturing the depth image may be used as reference values since they are caused by exclusively the cover of the ToF camera. Similarly, the charge values for the PMDs obtained when capturing an image for a code modulated signal limiting the measurement range of the ToF camera to substantially the cover as described above may be used as reference values.

Also scaling may be used for compensating different exposures times for the reference values and the charge values for the PMDs. That is, modifying 604 the charge values for the PMDs using the reference values may comprise scaling the reference values by a scaling factor to obtain scaled reference values. For example, the scaling factor may be based on (e.g. identical or proportional to) a ratio of the exposure time used for generating the reference values to the exposure time used for generating the charge values for the PMDs. Further, modifying 604 the charge values for the PMDs using the reference values may comprise modifying the charge values for the PMDs using the scaled reference values as described above in order to obtain the compensated charge values.

Further, similar to what is described above for the image level, scaling may be used to correct the charge values for the PMDs using reference values obtained when capturing an intensity (greyscale) image.

Figure 7:
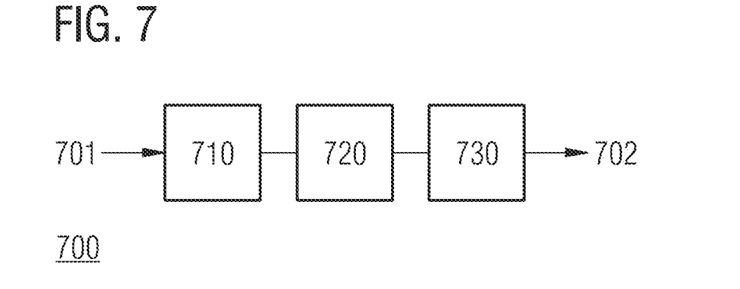
FIG. 7 illustrates an example of an apparatus for compensating light reflections from a cover of a ToF camera.

An example of an apparatus 700 for compensating light reflections from a cover of a ToF camera according to the proposed concepts is further illustrated in FIG. 7. The apparatus 700 comprises a processing circuit 720. For example, the processing circuit 720 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 720 may optionally be coupled to, e.g., read only memory (ROM) for storing software, random access memory (RAM) and/or non-volatile memory. The apparatus 700 may further comprise other hardware—conventional and/or custom.

The apparatus 700 comprises an input circuit 710 configured to receive input data 701 representing the image of the scene from the ToF camera or the charge values for the photonic mixer devices of the ToF camera. The processing circuit 720 processes the input data 701 according to the above described concepts for compensating the light reflections from the cover of the ToF camera. Accordingly, an output circuit 730 of the apparatus outputs output data 702 representing the compensated image of the scene or the compensated charge values.

For example, the functionalities of apparatus 700 may be implemented in an application processor coupled to a ToF camera module providing the image or to the ToF camera module itself.

The examples as described herein may be summarized as follows:

Some examples relate to a method for compensating light reflections from a cover of a ToF camera in an image of a scene that is sensed by the ToF camera. The method comprises receiving the image of the scene from the ToF camera. Further, the method comprises modifying the image of the scene using a reference image to obtain a compensated image of the scene. Pixels of the reference image indicate reference values exclusively related to light reflections from the cover of the ToF camera. Additionally, the method comprises outputting the compensated image.

According to some examples, an illumination element of the ToF camera for illuminating the scene and a light capturing element of the ToF camera for receiving reflected light from the scene are arranged in a common cavity that is covered by the cover.

In some examples, the image of the scene is one of a raw image, an image derived from the raw image, an intensity image, an image derived from the intensity image, a depth image or an image derived from the depth image.

The reference image is, according to some examples, a reference raw image.

In some examples, the ToF camera uses a continuous wave modulated signal for illuminating the scene and generates measurement signals based on reflected light from the scene. The image of the scene is a raw image that is based on correlations of the continuous wave modulated signal and the measurement signals according to a correlation function. The reference raw image is selected from a plurality of reference raw images based on a phase offset between the continuous wave modulated signal and the measurement signals as used for the correlations.

According to some examples, the ToF camera uses a continuous wave modulated signal for illuminating the scene. The reference raw image is selected from a plurality of reference raw images based on a frequency of the continuous wave modulated signal.

The reference raw image is, in some examples, based on a factory calibration.

According to some examples, the method further comprises controlling the ToF camera to use a code modulated signal for illumination such that a measurement range of the ToF camera ends immediately after the cover. A raw image that is captured by the ToF camera based on the code modulated signal is used as the reference raw image.

In some examples, the method further comprises receiving a depth image from the ToF camera and determining a closest reflective object depicted in the depth image. Additionally, the method comprises determining an exposure time for the ToF camera such that a measurement range of the ToF camera ends before the closest reflective object. Further, the method comprises controlling the ToF camera to capture an auxiliary raw image using the exposure time, wherein the auxiliary raw image is used as the reference image.

According to some examples, the method further comprises receiving a depth image from the ToF camera and determining whether any reflective object at a greater distance than the cover is depicted in the depth image. If no reflective object at a greater distance than the cover is depicted in the depth image, the method further comprises controlling the ToF camera to capture an auxiliary raw image, wherein the auxiliary raw image is used as the reference image.

The reference image is, in some examples, a reference depth image.

According to some examples, the method further comprises receiving a depth image from the ToF camera and determining whether any reflective object at a greater distance than the cover is depicted in the depth image. The depth image is used as the reference depth image if no reflective object at a greater distance than the cover is depicted in the depth image.

The reference image is, in some examples, a reference intensity image.

According to some examples, modifying the phase image of the scene using the reference intensity image comprises scaling the reference values indicated by the pixels of the reference intensity image by a scaling factor to obtain a scaled reference intensity image. Further, modifying the phase image of the scene using the reference intensity image comprises modifying the image of the scene using the scaled reference intensity image to obtain the compensated image.

In some examples, exposure times of the image of the scene and the reference image are equal.

If exposure times of the image of the scene and the reference image are different, modifying the image of the scene using the reference image comprises, according to some examples, scaling the reference values indicated by the pixels of the reference image by a scaling factor to obtain a scaled reference image. The scaling factor is based on a ratio of the exposure times of the image of the scene and the reference image. Further, modifying the image of the scene using the reference image comprises modifying the image of the scene using the scaled reference image to obtain the compensated image.

Further examples relate to an apparatus for compensating light reflections from a cover of a ToF camera in an image of a scene that is sensed by the ToF camera. The apparatus comprises an input circuit configured to receive the phase image of the scene from the ToF camera. Further, the apparatus comprises a processing circuit configured to modify the image of the scene using a reference image to obtain a compensated image of the scene. Pixels of the reference image indicate reference values exclusively related to light reflections from the cover of the ToF camera. The apparatus additionally comprises an output circuit configured to output the compensated image.

Still further examples relate to another apparatus for compensating light reflections from a cover of a ToF camera in an image of a scene that is sensed by the ToF camera. The apparatus comprises means for receiving the phase image of the scene from the ToF camera. Further, the apparatus comprises means for modifying the image of the scene using a reference image to obtain a compensated image of the scene. Pixels of the reference image indicate reference values exclusively related to light reflections from the cover of the ToF camera. The apparatus additionally comprises means for outputting the compensated image.

Other examples relate to a further method for compensating light reflections from a cover of a ToF camera. A light capturing element of the ToF camera is covered by the cover and comprises an array of photonic mixer devices. Each of the photonic mixer devices separates a charge generated by light arriving at the photonic mixer device so that two charge values are provided for the respective photonic mixer device. The method comprises receiving the charge values for the photonic mixer devices. Further, the method comprises modifying the charge values using reference values exclusively related to light reflections from the cover of the ToF camera to obtain compensated charge values. The method additionally comprises outputting the compensated charge values.

Still other examples relate to an apparatus for compensating light reflections from a cover of a ToF camera. A light capturing element of the ToF camera is covered by the cover and comprises an array of photonic mixer devices. Each of the photonic mixer devices separates a charge generated by light arriving at the photonic mixer device so that two charge values are provided for the respective photonic mixer device. The apparatus comprises an input circuit configured to receive the charge values for the photonic mixer devices. Further, the apparatus comprises a processing circuit configured to modify the charge values using reference values exclusively related to light reflections from the cover of the ToF camera to obtain compensated charge values. The apparatus additionally comprises an output circuit configured to output the compensated charge values.

Further examples relate to an apparatus for compensating light reflections from a cover of a ToF camera. A light capturing element of the ToF camera is covered by the cover and comprises an array of photonic mixer devices. Each of the photonic mixer devices separates a charge generated by light arriving at the photonic mixer device so that two charge values are provided for the respective photonic mixer device. The apparatus comprises means for receiving the charge values for the photonic mixer devices. Further, the apparatus comprises means for modifying the charge values using reference values exclusively related to light reflections from the cover of the ToF camera to obtain compensated charge values. The apparatus additionally comprises means for outputting the compensated charge values.

Examples relate to a non-transitory machine readable medium having stored thereon a program having a program code for compensating light reflections from a cover of a ToF camera as described herein, when the program is executed on a processor or a programmable hardware.

Other examples relate to a program having a program code for performing any of the methods for compensating light reflections from a cover of a ToF camera as described herein, when the program is executed on a processor or a programmable hardware.

Examples according to the proposed concept may allow cover glass error correction for ToF cameras (using e.g. continuous wave or coded modulation measurements).

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for compensating light reflections from a cover of a time-of-flight camera, the method comprising:
   receiving an image of a scene as illuminated by an illumination element of the time-of-flight camera;
   modifying the image of the scene using a reference image to obtain a compensated image of the scene, wherein pixels of the reference image indicate reference values exclusively related to reflections of light from the illumination element from the cover of the time-of-flight camera; and
   outputting the compensated image.

2. The method of claim 1, wherein the illumination element of the time-of-flight camera and a light capturing element of the time-of-flight camera for receiving reflected light from the scene are arranged in a common cavity that is covered by the cover.

3. The method of claim 1, wherein the image of the scene is one of a raw image, an image derived from the raw image, an intensity image, an image derived from the intensity image, a depth image or an image derived from the depth image.

4. The method of claim 1, wherein the reference image is a reference raw image.

5. The method of claim 4, wherein the time-of-flight camera uses a continuous wave modulated signal for illuminating the scene and generates measurement signals based on reflected light from the scene, wherein the image of the scene is a raw image that is based on correlations of the continuous wave modulated signal and the measurement signals according to a correlation function, and wherein the reference raw image is selected from a plurality of reference raw images based on a phase offset between the continuous wave modulated signal and the measurement signals as used for the correlations.

6. The method of claim 4, wherein the time-of-flight camera uses a continuous wave modulated signal for illuminating the scene, and wherein the reference raw image is selected from a plurality of reference raw images based on a frequency of the continuous wave modulated signal.

7. The method of claim 4, wherein the reference raw image is based on a factory calibration.

8. The method of claim 4, further comprising:
   controlling the time-of-flight camera to use a code modulated signal for illumination such that a measurement range of the time-of-flight camera ends immediately after the cover, wherein a raw image that is captured by the time-of-flight camera based on the code modulated signal is used as the reference raw image.

9. The method of claim 1, further comprising:
receiving a depth image from the time-of-flight camera;
determining a closest reflective object depicted in the depth image;
determining an exposure time for the time-of-flight camera such that a measurement range of the time-of-flight camera ends before the closest reflective object; and
controlling the time-of-flight camera to capture an auxiliary raw image using the exposure time, wherein the auxiliary raw image is used as the reference image.

10. The method of claim 1, further comprising:
receiving a depth image from the time-of-flight camera;
determining whether any reflective object at a greater distance than the cover is depicted in the depth image; and
if no reflective object at a greater distance than the cover is depicted in the depth image, controlling the time-of-flight camera to capture an auxiliary raw image, wherein the auxiliary raw image is used as the reference image.

11. The method of claim 1, wherein the reference image is a reference depth image.

12. The method of claim 11, further comprising:
receiving a depth image from the time-of-flight camera; and
determining whether any reflective object at a greater distance than the cover is depicted in the depth image, wherein the depth image is used as the reference depth image if no reflective object at a greater distance than the cover is depicted in the depth image.

13. The method of claim 1, wherein the reference image is a reference intensity image.

14. The method of claim 13, wherein modifying the image of the scene using the reference image comprises:
scaling the reference values indicated by the pixels of the reference intensity image by a scaling factor to obtain a scaled reference intensity image; and
modifying the image of the scene using the scaled reference intensity image to obtain the compensated image.

15. The method of claim 1, wherein exposure times of the image of the scene and the reference image are equal.

16. The method of claim 1, wherein if exposure times of the image of the scene and the reference image are different, modifying the image of the scene using the reference image comprises:
scaling the reference values indicated by the pixels of the reference image by a scaling factor to obtain a scaled reference image, wherein the scaling factor is based on a ratio of the exposure times of the image of the scene and the reference image; and
modifying the image of the scene using the scaled reference image to obtain the compensated image.

17. An apparatus for compensating light reflections from a cover of a time-of-flight camera, the apparatus comprising:
an input circuit configured to receive an image of a scene as illuminated by an illumination element of the time-of-flight camera;
a processing circuit configured to modify the image of the scene using a reference image to obtain a compensated image of the scene, wherein pixels of the reference image indicate reference values exclusively related to reflections of light from the illumination element from the cover of the time-of-flight camera; and
an output circuit configured to output the compensated image.

18. An apparatus for compensating light reflections from a cover of a time-of-flight camera, the apparatus comprising:
means for receiving a phase image of a scene as illuminated by an illumination element of the time-of-flight camera;
means for modifying the image of the scene using a reference image to obtain a compensated image of the scene, wherein pixels of the reference image indicate reference values exclusively related to reflections of light from the illumination element from the cover of the time-of-flight camera; and
means for outputting the compensated image.

19. A method for compensating light reflections from a cover of a time-of-flight camera, wherein a light capturing element of the time-of-flight camera is covered by the cover and comprises an array of photonic mixer devices, wherein each of the photonic mixer devices separates a charge generated by light arriving at the photonic mixer device so that two charge values are provided for the respective photonic mixer device, the method comprising:
receiving the charge values for the photonic mixer devices;
modifying the charge values using reference values exclusively related to light reflections from the cover of the time-of-flight camera to obtain compensated charge values; and
outputting the compensated charge values.

20. An apparatus for compensating light reflections from a cover of a time-of-flight camera, wherein a light capturing element of the time-of-flight camera is covered by the cover and comprises an array of photonic mixer devices, wherein each of the photonic mixer devices separates a charge generated by light arriving at the photonic mixer device so that two charge values are provided for the respective photonic mixer device, the apparatus comprising:
an input circuit configured to receive the charge values for the photonic mixer devices;
a processing circuit configured to modify the charge values using reference values exclusively related to light reflections from the cover of the time-of-flight camera to obtain compensated charge values; and
an output circuit configured to output the compensated charge values.

21. An apparatus for compensating light reflections from a cover of a time-of-flight camera, wherein a light capturing element of the time-of-flight camera is covered by the cover and comprises an array of photonic mixer devices, wherein each of the photonic mixer devices separates a charge generated by light arriving at the photonic mixer device so that two charge values are provided for the respective photonic mixer device, the apparatus comprising:
means for receiving the charge values for the photonic mixer devices;
means for modifying the charge values using reference values exclusively related to light reflections from the cover of the time-of-flight camera to obtain compensated charge values; and
means for outputting the compensated charge values.

* * * * *